(12) United States Patent
Gottin et al.

(10) Patent No.: US 12,372,374 B2
(45) Date of Patent: Jul. 29, 2025

(54) ORCHESTRATION OF ACTION-INPUT REPRESENTATIONS FOR DECISION MAKING IN EDGE ENVIRONMENTS

(71) Applicant: Dell Products L.P., Round Rock, TX (US)

(72) Inventors: Vinicius Michel Gottin, Rio de Janeiro (BR); Pablo Nascimento da Silva, Niterói (BR); Paulo Abelha Ferreira, Rio de Janeiro (BR); Werner Spolidoro Freund, Rio de Janeiro (BR); Julia Drummond Noce, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/050,274

(22) Filed: Oct. 27, 2022

(65) Prior Publication Data

US 2024/0142263 A1 May 2, 2024

(51) Int. Cl.
*G01C 21/00* (2006.01)
(52) U.S. Cl.
CPC .............................. *G01C 21/3841* (2020.08)
(58) Field of Classification Search
CPC .................................................. G01C 21/3841
USPC ...................................................... 701/450
See application file for complete search history.

(56) References Cited

U.S. PATENT DOCUMENTS

| | | | |
|---|---|---|---|
| 7,895,021 B1 | 2/2011 | Andrews, Jr. | |
| 8,261,033 B1 | 9/2012 | Slik et al. | |
| 10,142,353 B2 | 11/2018 | Yadav et al. | |
| 10,346,654 B2 | 7/2019 | Hochhalter et al. | |
| 10,429,197 B1 | 10/2019 | Carrino et al. | |
| 10,549,928 B1 | 2/2020 | Chavez et al. | |
| 10,584,971 B1 * | 3/2020 | Askeland | G01C 21/3859 |
| 10,878,386 B2 | 12/2020 | Hoofard et al. | |

(Continued)

FOREIGN PATENT DOCUMENTS

| | | | | |
|---|---|---|---|---|
| CN | 110537078 A | 12/2019 | | |
| CN | 116368355 A | 6/2023 | | |
| WO | WO-2020112827 A2 * | 6/2020 | ......... | G01C 21/3602 |

OTHER PUBLICATIONS

Tao, F et al., "Chapter 2—Applications of Digital Twin", Digital Driven Smart Manufacturing, Feb. 15, 2019, pp. 29-62, https://doi.org/10.1016/B978-0-12-817630-6.00002-3.

(Continued)

*Primary Examiner* — Tuan C To
(74) *Attorney, Agent, or Firm* — Workman Nydegger

(57) ABSTRACT

One example method includes identifying features for operational actions that are to be performed at an edge node of an edge computing system. The features include information used by the edge node to execute the operational actions. A first set of the features is received during an input processing stage. The first set of the features are used in the execution of the operational actions. In response to the execution of the operational actions, a second set of the one or more features are obtained, In response to retrieving the first set of the features or in response to obtaining the second set of the features, a local map is updated to include the features. The local map includes a subset of a global map, where the local map and the global map represent a shared representation of a map structure.

12 Claims, 9 Drawing Sheets

(56) References Cited

U.S. PATENT DOCUMENTS

| | | |
|---|---|---|
| 10,964,097 B2 | 3/2021 | Teply et al. |
| 11,077,548 B2 | 8/2021 | Stilwell |
| 11,157,527 B2 | 10/2021 | Wang et al. |
| 11,227,401 B1 | 1/2022 | Mahieu et al. |
| 11,312,379 B2 | 4/2022 | Taylor et al. |
| 11,314,254 B2 | 4/2022 | Macias et al. |
| 11,402,830 B2 | 8/2022 | Sullivan et al. |
| 11,436,504 B1 | 9/2022 | Lukarski et al. |
| 11,533,234 B2 | 12/2022 | Cencini et al. |
| 11,595,269 B1 | 2/2023 | Ghosh et al. |
| 11,792,262 B1 | 10/2023 | Chung et al. |
| 11,819,734 B2 | 11/2023 | Lee et al. |
| 11,836,563 B2 | 12/2023 | Khoche |
| 2002/0152318 A1 | 10/2002 | Menon et al. |
| 2010/0045701 A1 | 2/2010 | Scott et al. |
| 2012/0090667 A1 | 4/2012 | Cap et al. |
| 2012/0323431 A1 | 12/2012 | Wong et al. |
| 2013/0307720 A1 | 11/2013 | Lilburn |
| 2014/0074342 A1 | 3/2014 | Wong et al. |
| 2014/0278517 A1 | 9/2014 | Patel et al. |
| 2014/0309841 A1 | 10/2014 | Hara et al. |
| 2016/0071278 A1 | 3/2016 | Leonard et al. |
| 2016/0292908 A1 | 10/2016 | Obert |
| 2016/0359872 A1 | 12/2016 | Yadav et al. |
| 2017/0248963 A1 | 8/2017 | Levinson et al. |
| 2017/0317920 A1 | 11/2017 | Rocquelay et al. |
| 2018/0137390 A1 | 5/2018 | Brundage et al. |
| 2018/0137675 A1* | 5/2018 | Kwant ............ G06T 17/05 |
| 2018/0173239 A1 | 6/2018 | Yoon et al. |
| 2018/0222043 A1* | 8/2018 | Trovero ............ G06F 16/285 |
| 2019/0043246 A1 | 2/2019 | Teply et al. |
| 2019/0163191 A1 | 5/2019 | Sorin et al. |
| 2019/0285396 A1 | 9/2019 | Yao et al. |
| 2020/0026292 A1 | 1/2020 | Douillard et al. |
| 2020/0036595 A1 | 1/2020 | Wallerstein et al. |
| 2020/0370920 A1 | 11/2020 | Ahmed et al. |
| 2021/0021485 A1 | 1/2021 | Guim et al. |
| 2021/0107153 A1 | 4/2021 | Poornachandran et al. |
| 2021/0140773 A1 | 5/2021 | Ondruska et al. |
| 2021/0144517 A1 | 5/2021 | Guim et al. |
| 2021/0150771 A1 | 5/2021 | Huang et al. |
| 2021/0169417 A1 | 6/2021 | Burton |
| 2021/0187391 A1* | 6/2021 | Ekkati ............ G06T 15/00 |
| 2021/0233390 A1* | 7/2021 | Georgiou ............ G08G 1/0133 |
| 2021/0302260 A1 | 9/2021 | Baggs et al. |
| 2021/0389817 A1 | 12/2021 | Spinelli et al. |
| 2022/0082408 A1 | 3/2022 | Montemerlo et al. |
| 2022/0129426 A1 | 4/2022 | Sohail et al. |
| 2022/0131934 A1 | 4/2022 | Oku et al. |
| 2022/0138966 A1 | 5/2022 | Sung et al. |
| 2022/0147059 A1 | 5/2022 | Borne-Pons |
| 2022/0147407 A1 | 5/2022 | Asgar et al. |
| 2022/0187841 A1 | 6/2022 | Ebrahimi et al. |
| 2022/0200917 A1 | 6/2022 | Mortensen et al. |
| 2022/0203165 A1 | 6/2022 | Lee et al. |
| 2022/0204019 A1 | 6/2022 | Lauterbach et al. |
| 2022/0245111 A1 | 8/2022 | Harrison et al. |
| 2022/0292068 A1* | 9/2022 | Lin ............ G06F 16/322 |
| 2022/0329650 A1 | 10/2022 | Zhang et al. |
| 2022/0413989 A1 | 12/2022 | Karri et al. |
| 2023/0005217 A1 | 1/2023 | Chen et al. |
| 2023/0071442 A1 | 3/2023 | Tripathy et al. |
| 2023/0106877 A1 | 4/2023 | Simeonov et al. |
| 2023/0117081 A1 | 4/2023 | Hunter et al. |
| 2023/0156074 A1 | 5/2023 | Kim et al. |
| 2023/0161041 A1 | 5/2023 | Schindler et al. |
| 2023/0231903 A1 | 7/2023 | Zeng |
| 2023/0237064 A1 | 7/2023 | Bao |
| 2023/0275834 A1 | 8/2023 | Huang |
| 2023/0291794 A1 | 9/2023 | Bartholomew et al. |
| 2023/0297356 A1 | 9/2023 | Hudson |
| 2023/0376558 A1 | 11/2023 | Seyfi et al. |
| 2024/0050803 A1 | 2/2024 | Lee et al. |
| 2024/0143655 A1 | 5/2024 | Freund et al. |
| 2024/0144174 A1 | 5/2024 | Freund et al. |
| 2024/0362808 A1 | 10/2024 | Del et al. |

OTHER PUBLICATIONS

Dahmen et al., "Verification and validation of Digital twins and virtual testbed," International Journal of Advances in Applied sciences, vol. 11, n° 1, 2022.

N. Hubel, A. Gusrialdi, H. Fujita, and O. Sawodny, "Coverage Control with Information Decay in Dynamic Environments," Jan. 2008.

Hornung, A. et al. (2013) 'OctoMap: An efficient probabilistic 3D mapping framework based on octrees', Autonomous Robots, 34(3), pp. 189-206. doi:10.1007/s10514-012-9321-0.

Wurm, K.M. et al. (2011) 'Hierarchies of Octrees for Efficient 3D Mapping', (September). doi:10.1109/IROS.2011.6048189.

Hubel et al., Coverage Control with Information Decay in Dynamic Environments, 2008.

U.S. Appl. No. 18/049,700, filed Oct. 26, 2022, titled So-Map: A Semantic-Aware Algorithm for Optimizing the Representation Structure of Octomaps.

U.S. Appl. No. 18/050,274, filed Oct. 27, 2022, titled Orchestration of Action-Input Representations for Decision Making in Edge Environments.

Errandonea, Itxaro et al., "Digital Twin for Maintenance: A literature review", Computers in Industry 123 103316, Elsevier, Oct. 5, 2020.

McMahan, Communication-Efficient Learning of Deep Networks from Decentralized Data, version 3, Feb. 28, 2017, Artificial Intelligence and Statistics, pp. 1273-1282.

\* cited by examiner

ORCHESTRATION OF ACTION-INPUT REPRESENTATIONS FOR DECISION MAKING IN EDGE ENVIRONMENTS

FIELD OF THE INVENTION

Embodiments of the present invention generally relate to map structures. More particularly, at least some embodiments of the invention relate to systems, hardware, software, computer-readable media, and methods for orchestrating an update of a local and global shared representation of a map structure.

BACKGROUND

The orchestration—the automation and optimization—of dynamic edge environments is challenging and requires structured representations for decision making. In particular, the edge nodes in the edge environments may have limited resources or capabilities for summarizing and storing relevant information over long periods of time. Thus, the edge nodes may not be equipped for local processing of complex map structures.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1A:
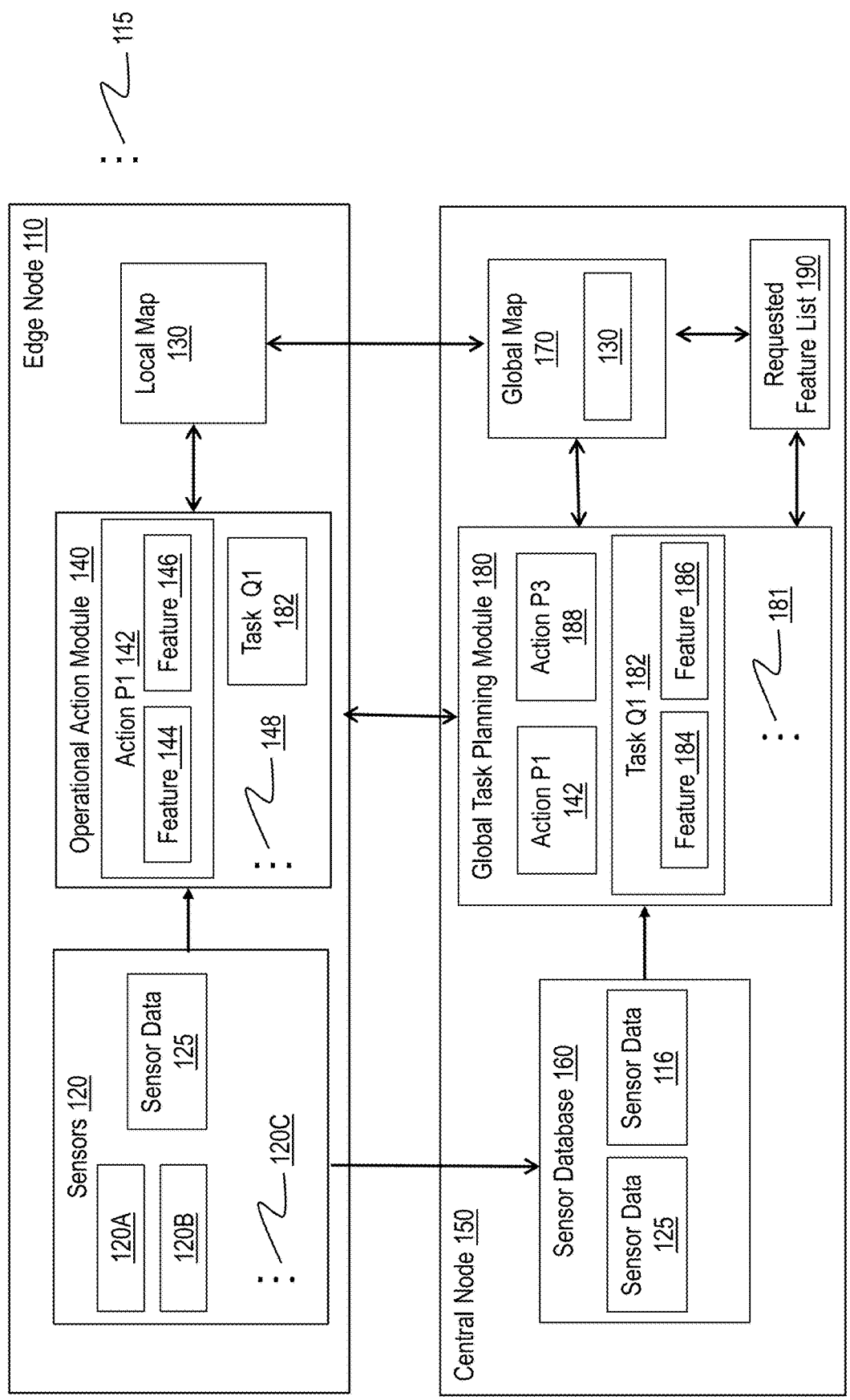
FIGS. 1A and 1B disclose aspects of an environment in which embodiments of the invention may be deployed or implemented.

Embodiments of the present invention generally relate to map structures. More particularly, at least some embodiments of the invention relate to systems, hardware, software, computer-readable media, and methods for orchestrating an update of a local and global shared representation of a map structure.

One example method includes identifying features for operational actions that are to be performed at an edge node of an edge computing system. The features include information used by the edge node to execute the operational actions. A first set of the features is received during an input processing stage. The first set of the features are used in the execution of the operational actions. In response to the execution of the operational actions, a second set of the one or more features are obtained, In response to retrieving the first set of the features or in response to obtaining the second set of the features, a local map is updated to include the features. The local map includes a subset of a global map, where the local map and the global map represent a shared representation of a map structure.

Another example method includes receiving a request from a first edge node of an edge computing system for features. The features include information used by the first edge node to execute operational actions. In response to the request, determining if a global map representing a global representation of a map structure includes the features. In response to determining that the global map does not include the features, determining if the global map includes a reference to a location of the features at a second edge node. In response to determining that the global map does include the reference, retrieving the features from the second edge node. The global map is upgraded with the retrieved features.

Another example method includes identifying features for decision-making tasks that are performed by a central node of an edge computing system. The features include information used by the central node to execute the decision-making tasks. It is determined if a global map representing a global representation of a map structure includes the features. In response to determining that the global map does not include the one or more features, the features are retrieved. The global map is updated to include the retrieved one or more features.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Aspects of an Example Architecture and Environment

FIG. 1A discloses aspects of an environment in which embodiments of the invention may be deployed or implemented. FIG. 1A illustrates a system (e.g., a logistics system) that includes edge nodes, represented by an edge node 110, which may be a mobile vehicle (e.g., forklifts, Autonomous Mobile Robots (AMR), automatic pallet loaders), and a central node 150, which may be a core node or a near edge node of an edge computing system. The edge nodes and the central node may coordinate to perform logistics operations. Thus, in some embodiments the environment 100 may be a warehouse or other related logistics environment.

As illustrated, the environment includes the edge node 110. The ellipses represent that there may be any number of additional edge nodes 115 in the environment 100. For example, if the environment 100 is a warehouse or other related logistics environment, there may a large number of edge nodes implemented as mobile vehicle (e.g., forklifts, Autonomous Mobile Robots (AMR), automatic pallet loaders) performing logistics operations. Accordingly, the explanation of the elements and operation of edge node 110 may also apply to the additional edge nodes 115 or at least to a subset of the additional edge nodes 115.

The edge node 110 includes a number of sensors 120. For example, the edge node 110 includes a sensor 120A, a sensor 120B, and any number of additional sensors as illustrated by the ellipses 120C. It will be appreciated that the edge node 110 is not limited to any particular number of sensors. The sensors 120 are configured to obtain sensor data about the surrounding area of the environment 100 and the actions of the edge node 110 in the environment. Accordingly, the sensors 120 include cameras, temperature sensors, velocity sensors, motion sensors, acceleration/deceleration sensors, weight sensors, RFID readers, LIDAR, local radar, or the like or combination thereof. In general, the sensors 120 generate sensor data that can be used to detect objects, detect events or conditions, record events, determine a position/orientation/direction/trajectory of the edge node 110 in the environment 100 (or its vicinity), velocity, direction of travel, or the like. The sensors 120 collect their sensor data periodically as needed or by a change in a value such as a change in acceleration. The sensor data is aggregated into sensor data 125, which will be updated every time one of the sensors 120 collects new data. Although not shown, the edge node 110 may include a database where the most recent version of the sensor data 125 is stored.

As shown in FIG. 1A, the central node 150 includes a sensor database 160. In operation, the edge node 110 sends the sensor data 125 to the sensor database 160 as needed. This may occur every time an update occurs or at some other defined time period so as to save on communication bandwidth. The additional edge nodes 115 also provide sensor data to the sensor database 160. The sensor data 125 and the sensor data from the additional edge nodes 115, which is designated as sensor data 116, are stored in the sensor database 160. The data generated by the sensors 120 and the sensors of the additional edge nodes 115 can be used to perform logistics actions, which include by way of example and not limitation, event detection actions, cornering detection actions, tracking actions, trajectory prediction actions, trajectory actions, alerting actions, positioning actions, object management actions, object monitoring actions, automation actions, safety actions, hazard detection actions, hazard avoidance actions, auditing actions, management actions, or the like or combination thereof.

The edge node 110 includes a local map 130 and the central node 150 includes a global map 170. The local map 130 and the global map 170 may represent a shared representation of a map structure that defines the environment and includes all information about the environment such as the location of objects in that environment. Thus, the global map 170 may represent all information in the map structure, while the local map 130 contains a local subset of the information that is contained in the global map 170. The subset of information found in the local map 130 will typically comprise relevant information for the surrounding area in the environment around the edge node 110.

Figure 1B:
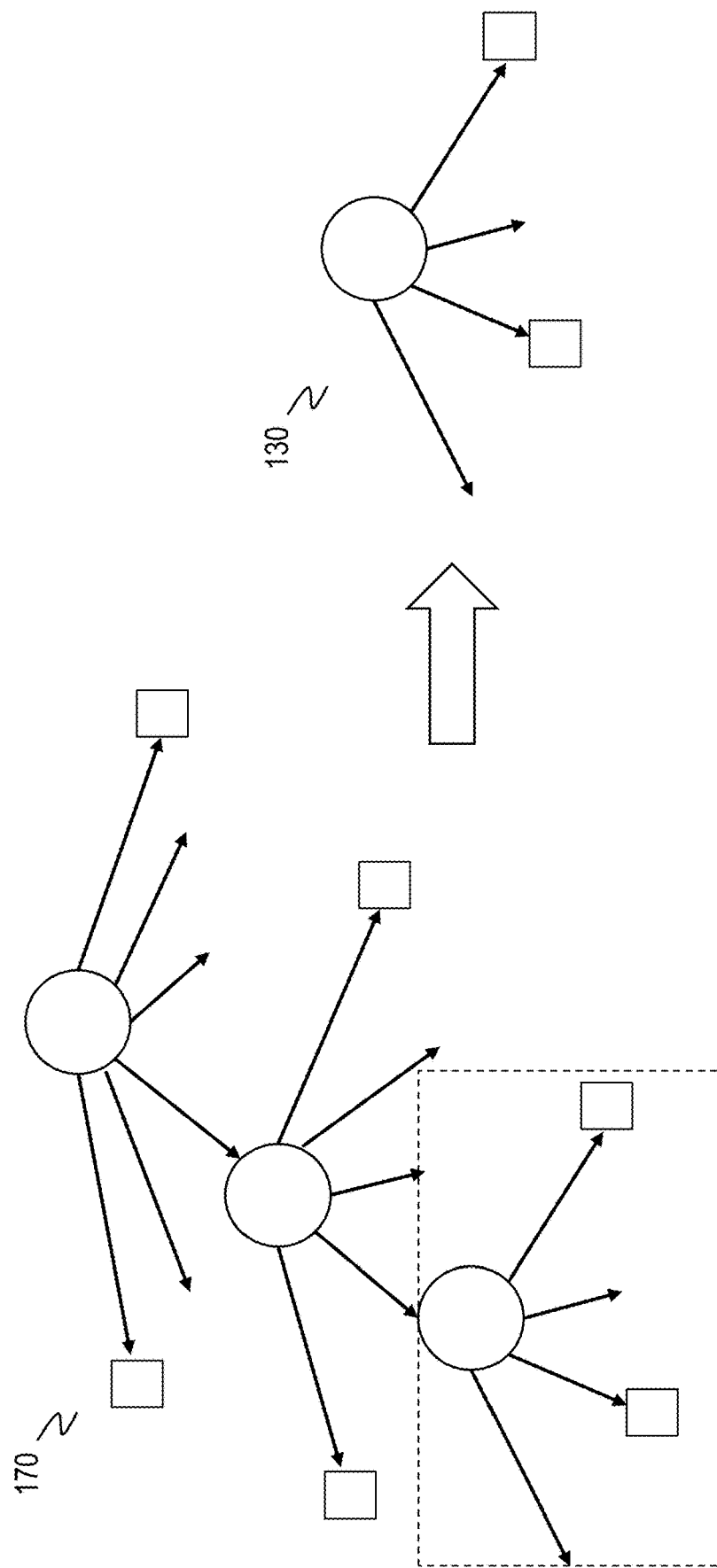

FIG. 1B illustrates an example embodiment of a map structure of the global map 170 and the local map 130. As shown in the figure, the global map 170 includes the entirety of the map structure. However, the local map only includes a portion of the global map, in this case the lowest node as indicated by the dashed lines. Thus, the all the information included in the local map 130 is also included in the global map 170. The global map 170 also includes information from all the other additional edge nodes 115.

The embodiment shown in FIG. 1B may be a hierarchical map structure where information is distributed downward in an increasingly granular manner. Thus, a higher node will include all the information of a lower node, while the lower node only includes a subset of the information of the lower node. In one embodiment, the map structure of the present invention may be an Octomap structure. It will be appreciated, however, that the embodiments and claims disclosed herein are not limited to any particular map structure as any type of map structure including those that are non-hierarchical may are also contemplated.

Although not directly illustrated, the edge node 110 includes some processing capabilities and thus is able to determine various operational actions to perform. The edge node 110 is able to use one or more machine-learning models that allow the edge node to perform the operational actions in conjunction with the collected sensor data 125 and other computer and hardware tools as needed. In addition, the central node 150 also includes some processing capabilities, which are typically larger than those of the edge node 110. Thus, the central node 150 is able to perform decision-making tasks that direct the operational actions of the edge nodes in the environment 100 using various machine-learning models and other computer and hardware tools as needed.

In the embodiments, operational actions are performed by the edge node 110 and the additional edge nodes 115. These actions are typically related to the operation and automatization of the edge nodes and may include actions that are in response to the collected sensor data 125. For example, one action may be detecting events of interest in the sensor data 125 and then raising an alarm based on a threshold of confidence over the detection of events related to dangerous conditions. Another example action may be related to navigation and pathfinding. For example, the node 110 may determine the necessary movement in the environment 100 to go from point A to point B and may consider the sensor data 125 and computer vision models to navigate obstacles in the way. A further example action may be parameterizing the operation of the edge node 110. For example, the edge node 110 may determine that, based on the current environmental conditions, it should operate more slowly to avoid accidents.

In the embodiments, the decision-making tasks are performed at the central node 150 and typically relate to optimization of the environment 100 as a whole. An example decision-making task is to determine a loading order for packages onto a truck. This task may involve the movement, loading, and unloading of pallets by the node 110 and a number of the additional edge nodes 115. Another example decision-making task is reasoning or informing about other tasks or actions in the environment. For example, the central node 150 may need, for the purposes of planning and orchestration, to predict the time-to-finish of actions of the edge nodes in the environment 100. For instance, to predict the time for the node 110 to go from point A to point B to unload a pallet. A further example decision-making task is reporting and visualization by requiring up-to-date information on the actions of the edge nodes in the environment 100 to that reports can be generated as needed.

The embodiments disclosed herein deal with the orchestration of how the local map 130 and the global map 170 are updated and how they are used in decision-making processes and operations. Thus, the embodiments disclosed herein provide for an orchestration scheme that advantageously minimizes communication overheads while allowing the use of the shared map structure of the local map 130 and the global map 170 for the decision-making tasks and the operational actions described previously. The orchestration scheme uses a predetermined relationship between data collected at the edge node 110 and the additional edge nodes 115 as inputs for the operational actions and the inputs needed for the decision-making tasks to orchestrate storage and communication of data across the environment 100.

The predetermined relationship between the inputs of the operational actions and the inputs for the decision-making tasks may be defined with respect to one or more features. In the embodiments, features are the information needed for the execution of the operational actions and the decision-making tasks, as well as their effects. That is, the inputs and outputs of the operational features and the inputs and outputs of decision-making tasks can be all be part of a set of known features in the environment 100.

The features are high-level characteristics or processed information of the environment 100 that are recorded as part of structure of the global map 170 and as part of the structure of the local map 130 when features are within the domain of the edge node 110. In some embodiments, the features are associated with a geographical position in the map structure, such that one node may hold a value for feature fi and another node may hold another value for the same feature fi in the same map structure. In an embodiment in which the map structure comprises an Octree structure, the positioning of the edge node that captures the feature is taken into account to determine the node (in the Octree) to which the feature will be associated.

Thus, the features may comprise any information available in the environment 100 that is needed so that an operational action or decision-making task may be performed. For example, if the operational action is the node 110 moving from point A to point B, the features may be related to the speed of the edge node, the position of the edge node, objects in the pathway of the edge node, and so forth. If the decision-making task is a loading order for packages onto a truck, the features may be related to the number edge nodes available, the weight of the packages, the environmental conditions at the location of the truck and so forth. Thus, the features can be any information that is needed from the environment 100. In some embodiments the features can be any information that (1) can be captured from the sensors 120 and/or other processes of the edge node 110 or the additional edge nodes 115, (2) can be used for the operational actions and the decision-making tasks, and (3) relate to a specific portion the environment 100.

In the embodiments, $\mathbb{A}$ denotes a set of known operational actions performed by edge nodes in the environment 100, thus $\mathbb{A} = \{a_0, a_1, \ldots\}$. For each action $a \in \mathbb{A}$, $i_a$ is defined to be the input of action a and $o_a$ is defined to be the output of action a. For example, in the operational action of navigation and pathfinding, the input may be features related to the positioning of the edge node 110 and the output may be features related to the trajectory of the edge node 110. Thus, $i_{a_0}$: $\{f_0, f_1\}$ and $o_{a_0}$: $\{f_2, f_3\}$ in one embodiment, where $f_0, f_1$ are features used as inputs for an operational action and $f_2, f_3$ are features that are the outputs of the operational action.

In the embodiments, $\mathbb{Q}$ denotes a set of known decision-making tasks performed by the central node 150 in the environment 100, thus $\mathbb{Q} = \{q_0, q_1, \ldots\}$. For each decision-making task, $q \in \mathbb{Q}$ defines a related set of features $f_q$, for example, $f_{q_0}$: $\{f_0, f_2, f_4\}$. In the example of a time-to-finish prediction task, a neural network may be trained to predict the duration of unloading a pallet, for example. The input features for this task may include: the characteristics of the edge node 110, its position relative to the pallet, the weight and dimensions of the pallet, and statistics of nearby entities (indicating, for example, other edge nodes 115 nearby). In the example of a loading order determination task the necessary features may comprise the dimensions of the container, the dimensions and weights of the packages, a cut-off deadline (i.e., a time limit for the loading of the packages into the container), and an estimated time for the loading of each package depending on its characteristics (current position, dimensions, fragility level, etc.).

The features are related to the operational actions through the implementation of an operational action module 140 that is configured to allow the edge node 110 to determine and execute one or more operational actions. The operational module 140 may be considered part of a decision-making pipeline in conjunction with a global task planning module 180 at the central node 150 as will be explained in more detail to follow.

As illustrated in FIG. 1A, the operational action module 140 is implemented at the edge node 110. Although not illustrated, the operational action module 140 is able to access the processing capabilities of the edge node 110, which may include predetermined computational processes, machine learning models, and/or actuators or other electronics. Thus, the operational action module 140 is able to partially determine or plan the operational actions it will undertake and the features that will be needed to perform the operational actions. It will be appreciated that some of the planning for the operational actions of the edge node 110 are performed by the global task planning module 180 of the central node 150. Besides autonomously (by the edge node 110 itself), the operational actions may be triggered by the central node 150, by human operators, or triggered in response to particular scenarios. For example, some operational actions may trigger from others (e.g., a pathfinding action may trigger another pathfinding one if an obstacle is found). Some operational actions to be performed by the edge node 110 will be determined by the global task planning module 180, as will be explained in more detail to follow.

As shown in FIG. 1A, the operational action module 140 may trigger an operational action P1 denoted at 142. The operational action P1 may be any operational action such as those previously discussed. The ellipses represent that the operational action module 140 may trigger any number of additional operational actions 148. FIG. 1A shows that the operational action P1 is associated with features 144 and 146. The features 144 and 146 may be input features is of the operational action P1, output features $o_a$ of the operational action P1, or a combination of both. Thus, the features 144 represent the information the operational action module 140 needs to perform the operational action P1. Some operational actions to be performed by the edge node 110 will be determined by the decision-making tasks of the global task planning module 180 as represented by a decision-making task Q1 denoted at 182 being associated with the operational action module 140.

The results, including the output features $o_a$, of the operational action P1 may be provided to the structure of the local map 130 if needed. As will be explained, if the local map 130 already includes the results and these results are not too old, then the local map may not need to be updated, thus saving on processing overhead.

In addition, the results of the operational action P1 may also be represented at the central node 150 as shown in FIG. 1. In addition, the results of operational actions performed by the additional edge nodes 115 may also be represented at the central node 150 as shown by operational action P3 denoted at 188. The representation at the central node 150 may comprise in some embodiments the communication that the operational actions P1 and P3 have begun and/or the communication of the results of P1 and/or P3 from the edge nodes 110 and/or 115. In other embodiments, the central node 150 may replicate the processing locally by relying on the sensor data 116 and/or 125 that is stored in the sensor database 160. Since replication at the central node 150 may induce some delay into the processing, this may be used when real-time aspects are not paramount, although replication may also be used when real-time aspects are paramount in some instances.

As mentioned above, the global task planning module 180 is included in the central node 150 and represents part of the decision-making pipeline. In operation, the global task planning module 180 is configured to provide orchestration and the dispatch of decision-making tasks. For example, a decision-making task Q1 denoted at 182 may be generated that includes features 184 and 186 as inputs. The ellipses illustrate that there may be any number of additional decision-making tasks 181 generated by the global task planning module 180. In some embodiments, the decision-making task Q1 and the additional decision-making tasks 181 may use the historical sensor data in the sensor database 160.

As mentioned previously, the operational tasks P1 and/or P3 may be used to determine the features 184 and 186 and other inputs such as sensor data from the sensor database 160 that are input into the decision-making task Q1. The input features 184 and 186 may also be provided by the structure of the global map 170 if needed as will be explained.

As discussed above, a set of related decision-making tasks and operational actions are known to be associated to a set of features of the environment 100. These features are represented in the map structure of the global map 170 and the local map 130 for those features in the domain of the edge node 110. A challenge arises when orchestrating updates of the map structure of the global map 170 and the local map 130. The embodiments disclosed herein provide a novel way to provide such updates while minimizing processing and communication overhead.

Aspects of Local Map Updates

Figure 2A:
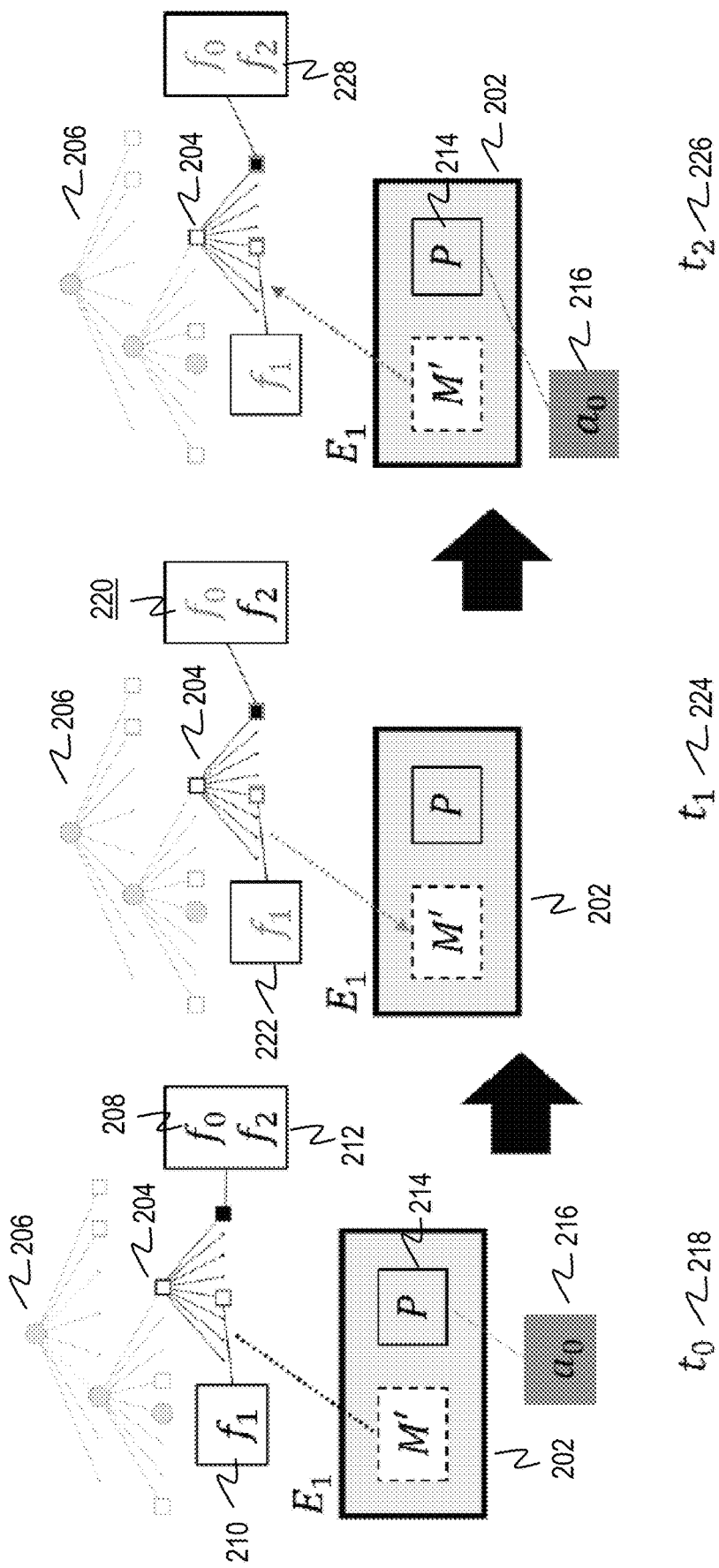
FIGS. 2A and 2B disclose aspects of updating a local map.

The update of the local map 130 will first be discussed in relation to FIGS. 2A and 2B. FIG. 2A illustrates an edge node 202, also labeled as $E_1$, that corresponds to the edge node 110. As shown, the edge node 202 includes a local map 204, also labeled as M', which corresponds to the local map 130. The local map 204 is the local representation of a subset of a global map 206, which corresponds to the global map 170. As also shown in FIG. 2A, the local map 204 may include values for a feature $f_0$, denoted at 208, a feature $f_1$, denoted at 210, and a feature $f_2$, denoted at 212. The figure also shows the location of the features in the map structure of the local map 204.

The edge node 202 also includes an operational action module 214, labeled as P, that corresponds to the operational action module 140. In the embodiment, the operational action module 214 triggers an operational action 216, also labeled as $a_0$, which may correspond to the operational action P1, at a time $t_0$, denoted at 218. The operational action 216 has $i_{a_0}$: $\{f_0, f_1\}$ and $o_{a_0}$: $\{f_2, f_3\}$. In some instances, the local map 204 may contain values for the input and output features and in other instances, the local map 204 may only include values for some of the input and/or output features or perhaps none of them.

In the embodiment of FIG. 2A, the features $f_0$ and $f_1$ are acquired from the sensor data 125, which in the embodiment takes some amount of time. Alternatively, they may be acquired from the central node 150, which also will take some amount of time. Thus, in order for the operational action 216 to be performed, the features $f_0$ and $f_1$ need to be updated and the updated values of the features are updated in the local map 204, as denoted at 220 and 222 at a time $t_1$, denoted at 224, that is later than the time $t_0$.

In the embodiment of FIG. 2A, the operational action 216 concludes at a time $t_2$, denoted at 226, that is later than the time $t_1$. At the time $t_2$, the performance of the operational action 216 may have changed the values of the output features and so the changed values of the output features are updated in the local map 204. In the embodiment, however, only the feature $f_2$ is updated in the local map as denoted at 228, because the feature $f_3$ is not part of the local map 204, although it may be part of the global map 206 and be part of a local map of one of the additional edge nodes 115. This is because in the embodiment of FIG. 2A, the edge node 202 only stores features that are relevant to it, unless directed by the central node 150 to store features that may be relevant to one of the additional edge nodes 115. In this case, feature h is not relevant to the edge node 202 and the central node 150 has not requested the feature be stored at the edge node 202 and so it is discarded, at least from the perspective of the edge node 202.

Figure 2B:
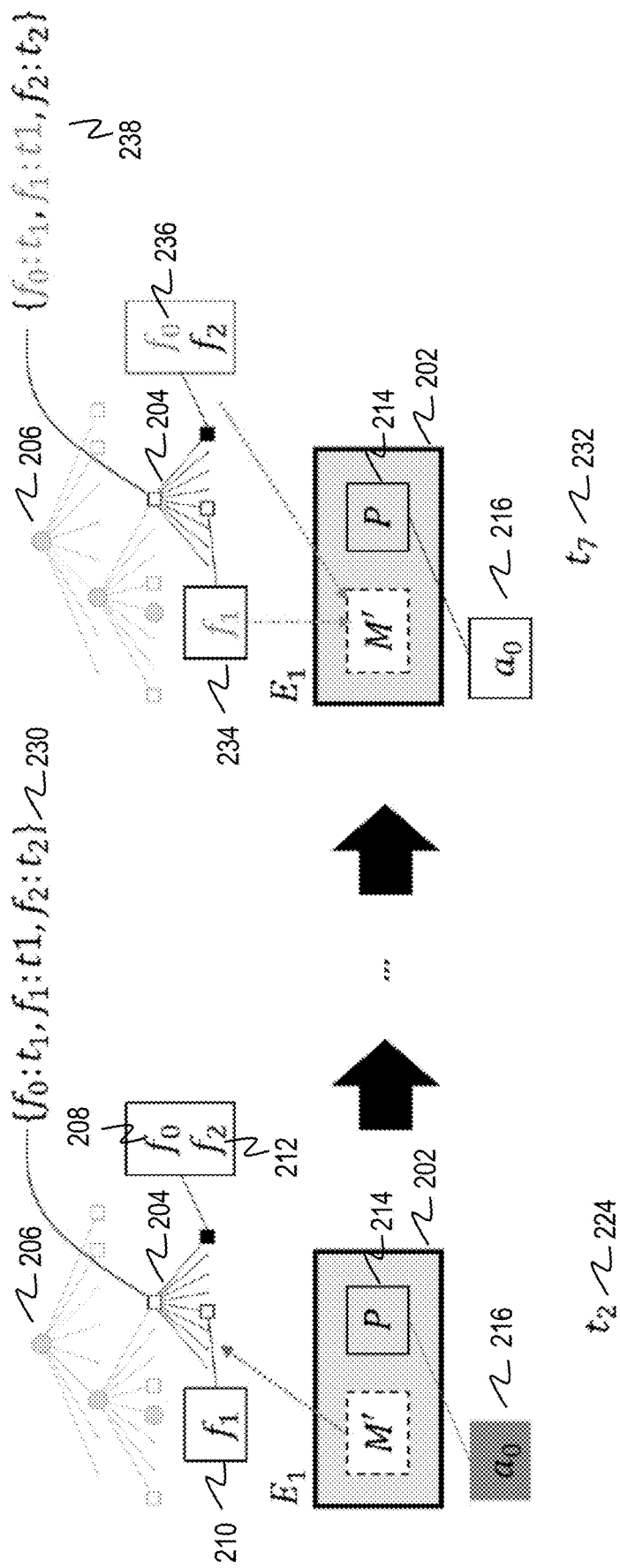

FIG. 2B illustrates that in some embodiments, besides the values of the features and their locations, the local map 204 may also contain metadata that relates the features to a latest update timestamp. As illustrated in FIG. 2B at 230, at time $t_2$, features $f_0$ and $f_1$ have a timestamp of the update at $t_1$ and feature $f_2$ has a timestamp of the update at $t_2$ since features $f_0$ and $f_1$ were updated during $t_1$ and feature $f_2$ was updated during $t_2$. FIG. 2B also illustrates that in those embodiments where the local map 204 is hierarchical, the metadata relating the features to the timestamps may be propagated upward to a root node of the local representation. That is, the metadata specifying the timestamps does not need to be written in the map structure at the same location as the feature values are written.

FIG. 2B also illustrates that some input features for an operational action may already be locally available at the edge node 110. As previously described, the input features $f_0$ and $f_1$ along with their respective timestamps are included in the local map 204. When the operational action 216 is again started at a later time $t_7$, denoted at 232, the operational action module 214 may apply pre-determined rules for each feature that specify whether the features are recent enough at the local map 204 to be used at time $t_7$. In other words, a determination is made if the features are recent enough that the information they contain would still be useful in performing the action. For example, if the operational action was having the edge node 202 move from the point A to point B and a feature was a the current position of the edge node 202, then the feature would not be useful if its value indicated a location other than its location at time $t_7$. In the embodiment of FIG. 2B, feature f1 is deemed too out-of-date and must again be reacquired as shown at 234, but feature f0 is considered recent enough and is reused as denoted at 236. This is also shown at 238. This minimizes the processing and management overhead of the local map 204 at the edge node 202.

It will be appreciated that the embodiment of FIGS. 2A and 2B illustrates that the local map 204 only records features that are relevant to the operational actions of the edge node 202 in the local map 204. Feature that are not relevant are discarded and not recorded in the local map, unless the central node 150 requests that such features be recorded, usually for the use of the central node or for the use of one of the additional edge nodes 115. This process saves on processing overhead at the edge node and communication overhead between the edge node and the central node.

Figure 3:
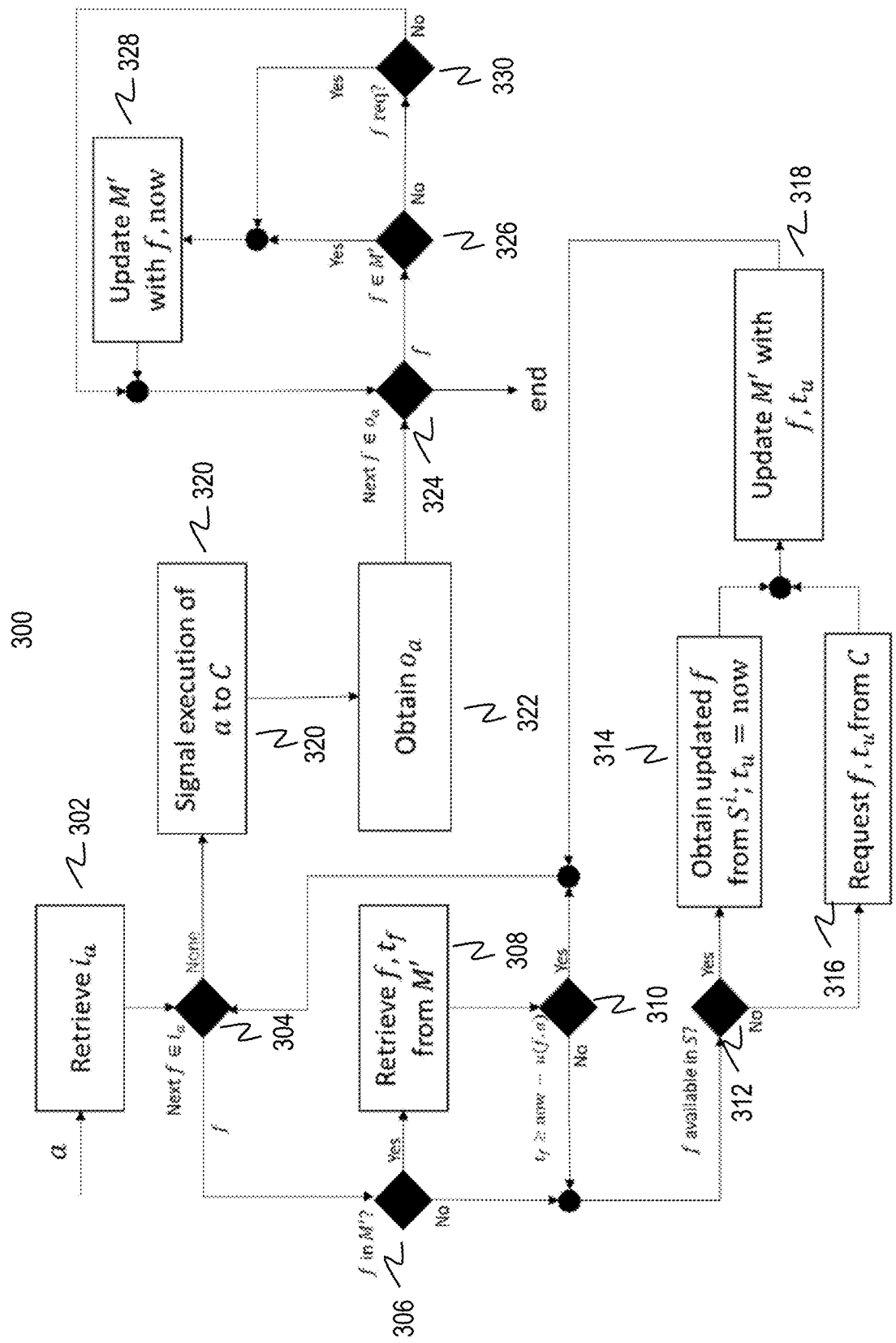
FIG. 3 illustrates a flowchart of a method for updating a local map at an edge node.

FIG. 3 illustrates a flowchart of an overall method 300 for updating a local map at an edge node such as the local map 130 at the edge node 110. In particular, the method 300 describes how the edge node for a given operational action reads from and writes to the local map and how the edge node communicates with the central node to request features that are not part of the local map.

For a new operational action $a_0$ that is to be performed at the edge node 110, at step 302 the input feature set required for the performance of the operational action $a_0$ are retrieved. For example, in the embodiment wherein the input is $i_{a_0}$: $\{f_0, f_1\}$, the input feature set may include $f_0$ and $f_1$.

At the decision step 304, it is determined if there is a next input feature f in the input feature set that needs to be processed by the edge node 110. When it is determined that there is a next input feature f in the input feature set that needs to be processed, the process goes to decision step 306.

At decision step 306, it is determined if the input feature f is included in the local map. If the answer is yes to decision step 306, the process goes to step 308, where the input feature f and its corresponding timestamp $t_f$ are retrieved from the local map.

The method then goes to decision step 310, where it is determined if the timestamp $t_f$ is recent enough for the operational task by comparing the time stamp $t_f$ with a current timestamp $t_u$ to determine an amount of time that has passed since the features were added to the local map 130. One or more predetermined rules may specify a maximum allowed amount of time that can pass before the feature is considered too old to be used. Thus, when it is determined that the amount of time that has passed does not exceed a maximum allowed amount of time, the input feature f can be used to perform the operational action.

If the answer is yes at decision step 310, the input feature f is satisfied and the process returns to step 304 for determination if there is a next input feature in the input feature set, for example input feature $f_2$ following input feature $f_1$.

If the answer to decision step 306 is no because the input feature f is not included in the local map or if the answer to decision step 310 is no because the timestamp $t_f$ is not recent enough compared to current timestamp $t_u$, the process goes to decision step 312, where it is determined if the input feature f can be extracted from sensor data such as sensor data 125. If the answer is yes in decision step 312, the process goes to step 314, where the input feature f is extracted from the sensor data and where the extracted input feature is given the current timestamp $t_u$ as its timestamp.

If the answer is no in decision step 312, the process goes to step 316, where the input feature f is requested from a central node such as the central node 150. The requested input feature f should have the current timestamp $t_u$, or should otherwise be recent enough to be of use in performing the operational action. Step 316 typically occurs when the input feature f relates to an area of the environment 100 that is outside the scope of the edge node, that is the input feature f includes information that the edge node 110 is unable to obtain on its own due to its location in the environment 100.

The process moves to step 318 when the input feature f is extracted from the sensor data at step 314 or if it is received from the central node at step 316. At step 318, the local map 130 is updated with the input feature f that has a current timestamp $t_u$. In other words, since a new value has been acquired for the input feature f, the local map is updated to include this new value so that steps 314 and 318 are performed needlessly. The process then returns to step 304 for determination if there is a next input feature in the input feature set.

It will be noted that in the method 300, it is preferrable to obtain the input feature f and it timestamp from the local map at step 308 then to perform steps 314 and 316 even when it would be possible to obtain the input feature f at steps 314 and 318. For example, obtaining the input feature f from the sensor data may require a large amount of the edge node processing power and will take more time than simply reading it from the local map. Obtaining the input feature f from the central node will consume communication overhead and may take a long amount of time, potentially delaying the performance of the operational action. It will be appreciated that if the input feature f is not available in the local map at step 308, then it is preferable to obtain the input feature locally from the sensor data than to request and received it from the central node as less resource are consumed in step 314 than in step 316. In some embodiments, the steps 302-318 may be considered an input processing stage.

Once all the input features of the input feature set needed to perform the operational action as $a_0$ have been processed by the edge node 110, it will be determined at decision step 304 that there are no more input features in the input feature set that need to be processed. The process with then go to step 320. During step 320 the operational action $a_0$ will begin to be executed and this execution is reported to the central node 150 as previously described in relation to P1 and P3 in FIG. 1A. This allows the central node to know that the operational action $a_0$ is being executed and which new output features are about to become available in the environment 100 that can be used by the central node or provided to one of the additional edge nodes 115 for use in performing an operational task.

The process then moves to step 322, where the operational action $a_0$ is completed. In step 322, the output features $o_{a_0}$ of the operational action $a_0$ are obtained. In the embodiment where the output is $o_{a_0}$: $\{f_2, f_3\}$, the output features may include $f_2$ and $f_3$.

At the decision step 324, it is determined if there is a next output feature f in the output feature set that needs to be processed by the edge node 110. When it is determined that there is a next output feature f in the output feature set that needs to be processed, the process goes to decision step 326. When it is determined that there are no more output features of the output feature set to process, the method ends.

At decision step 326, it is determined if the output feature f is included in the local map 130. If the answer is yes in decision step 326, the process goes to step 328. At step 328, the local map 130 is updated with the output feature f that has the current timestamp $t_u$. Thus, the updated value of the output feature f is included in the local map. The step 328 in response to a yest in decision step 326 may correspond to time $t_2$ in FIGS. 2A and 2B. The process then returns to decision step 324.

If the answer is no in decision step 326, the process goes to decision step 330, where it is determined if the output feature f has been requested by the central node 150. If the answer is no in decision step 330, then the central node has not requested the output feature f and the process is discarded and the process returns to decision step 324. A no in decision step 330 may correspond to the discussion of $f_3$ being discarded in FIGS. 2A and 2B.

If the answer is yes in decision step 330, this means that the central node has requested the output feature f and the process goes to step 328, where the local map 130 is updated with the output feature f that has the current timestamp $t_u$. A yes in decision step 330 may be because one of the additional edge nodes 115 needs the output feature for execution of an operational action. For example, in regard to $f_3$ being discarded in FIGS. 2A and 2B, if the answer is yes in decision step 330, h would not be discarded, but would be included in the local map 130.

Thus, method steps 322-330 in general teach that due to the limited resources at the edge node 110, not all of the output features will be included in the local map 130. Rather, it is verified if an output feature already exists in the local map. If so, the value and timestamp of the output feature is updated in the local map. In some embodiments, the method steps 322-330 may be considered an output processing stage.

Otherwise, it is determined if the output feature has been requested by the central node. This determination may be based on a registry kept at the edge node 110 that includes the features that the edge node needs for future or scheduled operational actions and the features that have been requested by the central node 150 for decision-making tasks. This helps to reduce resource consumption at the edge node because only features needed by the edge node or requested by the central node are required to be included in the local map 130.

Aspects of Global Map Updates

As previously discussed, the central node 150 does not directly acquire the sensor data 116 and 125, but rather relies on the edge node 110 and the additional edge nodes 115 to collect sensor data. Accordingly, the global map 170 is thus updated with information that is acquired remotely. However, due to the number of edge nodes in the environment 100 and the resource restrictions of the environment, it may not be feasible to constantly communicate the features that are collected at the edge nodes 110 and 115 to the central node 150. Rather, the embodiments disclosed herein orchestrate an on-demand update of the global map 170.

The global map 170 may hold different types of content: a concrete value for each feature or references to edge nodes that contain the values of the feature. The global map 170 also associates each feature value or feature reference with a timestamp that may correspond to the timestamps discussed previously in relation to the local map 130. That is, for a feature f, the global map 170 may hold the most recently acquired feature value and the associated timestamp. Alternatively, the global map 170 may instead hold a reference to the edge node that holds that feature value, along with the associated timestamp. This is shown in FIG. 4.

Figure 4:
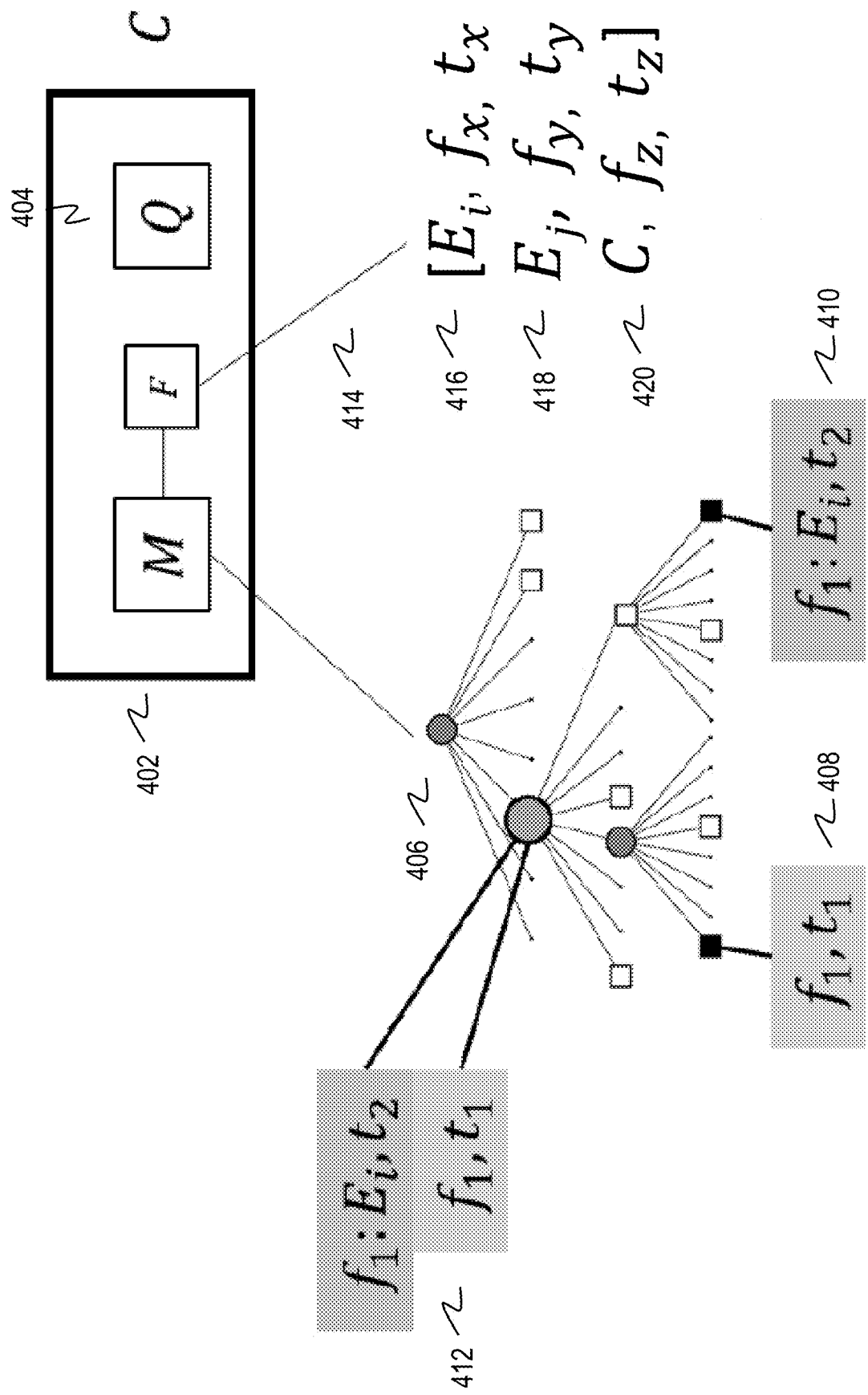
FIG. 4 illustrates aspects of a global map.

FIG. 4 illustrates a central node 402, also labeled as C, which may correspond to the central node 150. The central node 402 includes a global task planning module 404, also labeled as Q, which corresponds to the global task planning module 180. The central node 402 also includes a global map 406, also labeled as M, which corresponds to the global map 170 and which is a global representation of a map structure as shown in FIG. 1B.

As shown in FIG. 4, the global map 406 includes different types of entries having different types of content. For example, global map 406 includes an entry 408 for the feature value $f_1$ and its associated time stamp $t_1$. In addition, the global map includes a reference entry 410 that specifies that the feature value $f_1$ and its associated time stamp $t_2$ are located at an edge node $E_i$, which may correspond to the edge node 110. For example, entry 408 may represent that the feature value $f_1$ is located in one portion of the environment 100 and the reference entry 410 may represent that the feature value $f_1$ is also located at a different location in the environment. For instance, both features may represent temperature readings from two different locations in a warehouse.

FIG. 4 also shows that for hierarchical map structures, both the actual feature values and the references to the feature values may be propagated up to root node in the map structure as shown at 412. In some embodiments, only the most recent data at a certain level of the structure is kept. Thus, only the reference value would be kept as it was updated at a later timestamp. Accordingly, the global map 170 is able to be updated by simply including the reference to a feature value without actually having to receive the feature value is some circumstances, which may advantageously save on communication overhead in the environment.

In some embodiments, the central node 150 includes an additional structure that may be used in conjunction with the global task planning module 404 to help with the update of the global map. This additional structure is a requested feature list 414, which is also shown in FIG. 1A as requested feature list 190. The requested feature list 414 is configured to hold a list of features that are requested by a scheduled decision-making task of the central node 402 or that are requested by one of the edge nodes in the environment 100. In addition, requested feature list 414 includes, for each feature, a maximum time stamp indicating that the requested feature should be obtained by the central node or an edge node before the timestamp to ensure that the information of the feature is still useful for the tasks and operations in the environment. The timestamps may also help to ensure that old requests are discarded in a timely manner so as to prevent the requested feature list 414 from becoming too large.

As shown in FIG. 4, the requested feature list 414 includes a first request 416 in tuple form that indicates that an edge node $E_i$ has requested a feature $f_x$ before the expiration of the maximum timestamp $t_x$. A second request 418 in tuple form indicates that an edge node $E_j$ has requested a feature $f_y$ before the expiration of the maximum timestamp $t_y$. A third request 420 in tuple form indicates that the central node 402 has requested a feature $f_z$ before the expiration of the maximum timestamp $t_z$ to complete a decision-making task.

Figure 5:
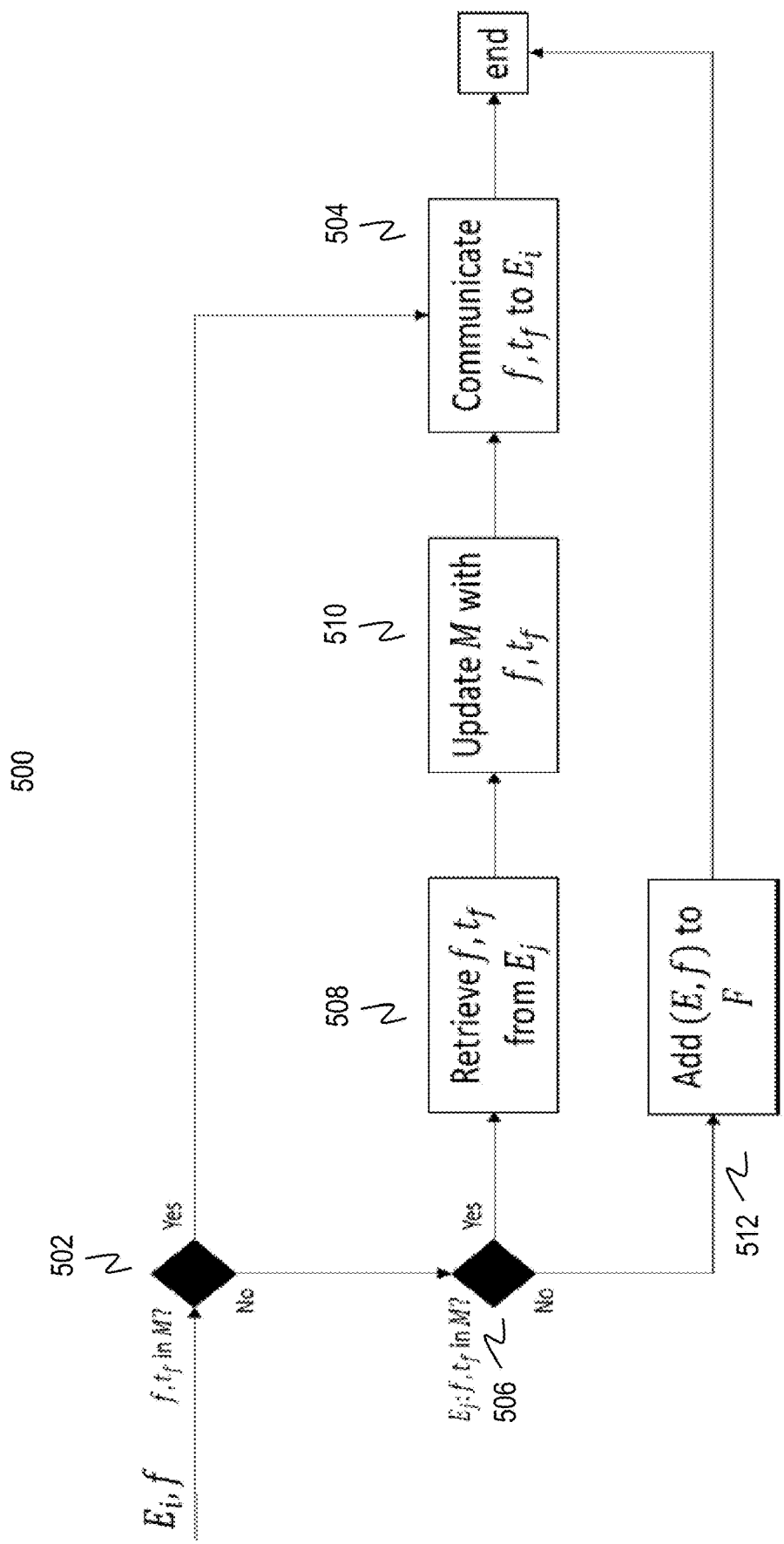
FIG. 5 illustrates a flowchart of a method for a central node to update a global map.

FIG. 5 illustrates a flowchart of an overall method 500 for the central node 150 to update the global map 170 and provide a requested feature or feature set to an edge node that has requested the feature. In some embodiments, the method 500 may be in response to step 316 in method 300. In particular, the central node 150 checks to see if it has access to the requested feature value, in which case it provides the feature value to the requesting edge node. If it does not have access to the requested feature value, either because the feature does not yet exist in the environment or because the feature is scheduled to be updated, the central node update the requested feature list 414 to reflect the requested feature.

At a decision step 502, it is determined if a request from an edge node $E_i$ for a feature f having timestamp $t_f$ is available in the global map 170. If the answer to decision step 502 is yes, the process moves to step 504. At step 504, the feature f having timestamp $t_f$ is communicated to the edge node $E_i$, where it can be included in the local map 130 as previously discussed. In some embodiments, a check is done to determine if the timestamp $t_f$ is still valid. The method 500 then ends.

If the answer to decision step 502 is no, then the process goes to decision step 506. At decision step 506, it is determined if the global map 170 includes a reference to the feature f having timestamp $t_f$, such as reference entry 410. If the answer to decision step 506 is yes, then the process moves to step 508.

In step 508, the central node 150 retrieves the feature f having timestamp $t_f$ from an edge node $E_j$, which is different from the edge node $E_i$. The process then moves to step 510. In step 510, the central node 150 updates the global map 170 with the value of feature f having timestamp $t_f$. The process then goes to step 504. At step 504, the feature f having timestamp $t_f$ is communicated to the edge node $E_i$. In some embodiments, a check is done to determine if the timestamp $t_f$ is valid. The method 500 then ends.

If the answer to decision step 506 is no, then the process proceeds to step 512, In step 512 the central node 150 adds a request to the requested feature list 190 for the feature f having timestamp $t_f$. The central node 150 will then orchestrate the collection of the feature f having timestamp $t_f$ from other edge nodes. The method 500 then ends.

Figure 6:
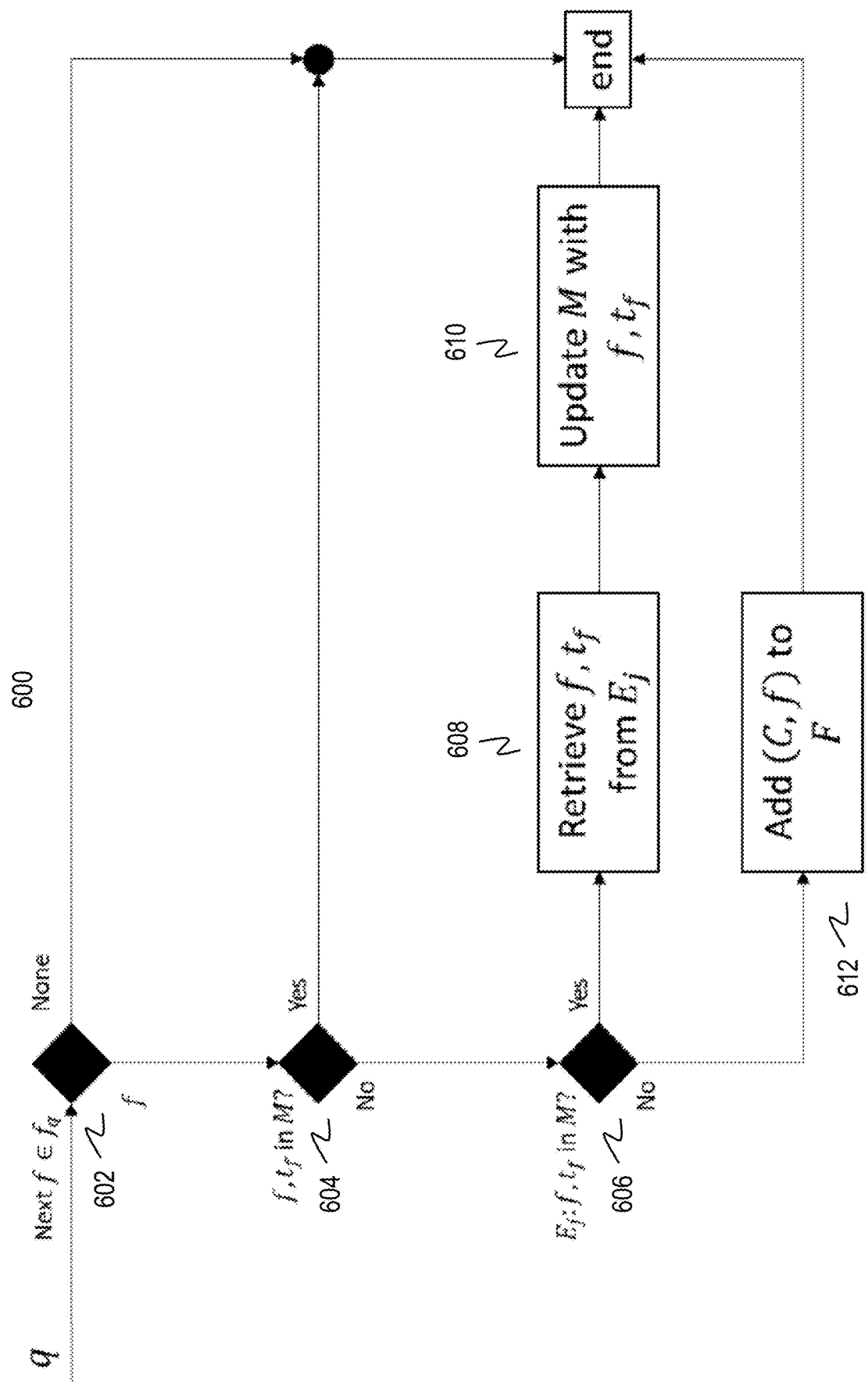
FIG. 6 illustrates a flowchart of a method for a central node to update a global map.

FIG. 6 illustrates a illustrates a flowchart of an overall method 600 for the central node 150 to update the global map 170 and provide a requested feature or feature set to be used in a decision-making task q scheduled by the global task planning module 180. In particular, the central node determines if the feature values needed for the decision-making task q are included in the global map 170.

At a decision step 602, it is determined if there is a next feature f in a decision-making task feature set $f_q$ that needs to be processed by the central node. If the answer in the decision step 602 is no, the method 600 ends. However, if the answer in the decision making process is yes, indicating there is a next feature f in the decision-making task feature set $f_q$ to process at the central node, the process goes to decision step 604.

In decision step 604, it is determined if a feature f having timestamp $t_f$ is available in the global map 170. If the answer to decision step 604 is yes, then the method 600 ends as the central node 150 has the feature value needed to perform the decision-making task q.

If the answer to decision step 604 is no, then the process goes to decision step 606. At decision step 606, it is determined if the global map 170 includes a reference to the feature f having timestamp $t_f$, such as reference entry 410. If the answer to decision step 606 is yes, then the process moves to step 608.

In step 608, the central node 150 retrieves the feature f having timestamp $t_f$ from an edge node $E_j$. The process then moves to step 610. In step 610, the central node 150 updates the global map 170 with the value of feature f having timestamp $t_f$. The method 600 then ends as the central node 150 now has the feature value needed to perform the decision-making task q.

If the answer to decision step 606 is no, then the process proceeds to step 612, In step 612 the central node 150 adds a request to the requested feature list 190 for the feature f having timestamp $t_f$. The central node 150 will then orchestrate the collection of the feature f having timestamp $t_f$ from other edge nodes. The method 600 then ends.

In summary, the update process of the global map 170 may be triggered by step 316 in method 300, that is by a request for a feature from an edge node. The update process of the global map 170 may also be triggered by steps 510 of method 500 and step 610 of method 600, that is when the concrete feature value for a feature reference in the global map is retrieved from the edge node where the feature value is located. This process ensures that the features that have been requested by one edge node will be stored by other edge nodes in a dynamic fashion. The edge nodes will store only locally required information on their local maps, plus any feature strictly requested by the central node.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: identifying one or more features for one or more operational actions that are to be performed at an edge node of an edge computing system, the one or more features including information used by the edge node to execute the one or more operational actions; retrieving a first set of the one or more features during an input processing stage; using the first set of the one or more features in the execution of the one or more operational actions; in response to the execution of the one or more operational actions, obtaining a second set of the one or more features; and in response to retrieving the first set of the one or more features or in response to obtaining the second set of the one or more features, updating a local map to include the one or more features, the local map including a subset of a global map, where the local map and the global map represent a shared representation of a map structure.

Embodiment 2. The method of embodiment 1, wherein retrieving the first set of the one or more features during the input processing stage comprises: retrieving one or more features that exist in the local map at the time of the input processing stage.

Embodiment 3. The method of embodiment 1 and/or 2, wherein retrieving the first set of the one or more features during the input processing stage comprises: extracting the one or more features from sensor data collected at the edge node.

Embodiment 4. The method of embodiment 1, 2, and/or 3, wherein retrieving the first set of the one or more features during the input processing stage comprises: receiving the one or more features from a central node of the edge computing system in response to a request for the one or more features from the edge node.

Embodiment 5. The method of embodiment 1, 2, 3, and/or 4, wherein the one or more features are associated with a timestamp when being included in the local map during the update to the local map.

Embodiment 6. The method of embodiment 1, 2, 3, 4, and/or 5, wherein retrieving the first set of the one or more features during the input processing stage comprises: accessing a timestamp associated with the one or more features that exist in the local map at the time of the input processing stage, the timestamp identifying when the one or more features was included in the local map; based on the timestamp, determining an amount of time that has passed since the one or more features were included local map; and using the one or more features that exist in the local map at the time of the input processing stage in the execution of the one or more operational actions when it is determined that the amount of time that has passed does not exceed a maximum allowed amount of time.

Embodiment 7. The method of embodiment 6, further comprising: in response to determining that the amount of time that has passed does exceed a maximum allowed amount of time, not using the one or more features that exist in the local map at the time of the input processing stage in the execution of the one or more operational actions; and extracting the one or more features from sensor data collected at the edge node; or receiving the one or more features from a central node of the edge computing system in response to a request for the one or more features from the edge node.

Embodiment 8 The method of embodiment 1, 2, 3, 4, 5, 6, and/or 7, wherein in response to obtaining the second set of the one or more features, updating in the local map the one or more features of the second set that existed in the local map prior to the execution of the one or more operational actions.

Embodiment 9. The method of embodiment 1, 2, 3, 4, 5, 6, 7, and/or 8, wherein in response to obtaining the second set of the one or more features, updating in the local map the one or more features of the second set that are included in a request from a central node of the edge computing system.

Embodiment 10. The method of embodiment 1, 2, 3, 4, 5, 6, 7, 8, and/or 9, wherein in response to obtaining the second set of the one or more features, not updating in the local map the one or more features of the second set that did not exist in the local map prior to the execution of the one or more operational actions and that are not included in a request from a central node of the edge computing system.

Embodiment 11. The method of embodiment 1, 2, 3, 4, 5, 6, 7, 8, 9, and/or 10, wherein the one or more operational actions to be executed are defined in a decision-making task generated by a central node of the edge computing system.

Embodiment 12. The method of embodiment 1, 2, 3, 4, 5, 6, 7, 8, 9, 10, and/or 11, wherein the global map has a hierarchical structure. Embodiment 13. The method of embodiment 12, wherein the global map is an Octomap.

Embodiment 14. A method for receiving a request from a first edge node of an edge computing system for one or more features, the one or more features including information used by the first edge node to execute the one or more operational actions; in response to the request, determining if a global map representing a global representation of a map structure includes the one or more features; in response to determining that the global map does not include the one or more features, determining if the global map includes a reference to a location of the one or more features at a second edge node; and in response to determining that the global map does include the reference, retrieving the one or more features from the second edge node; and updating the global map with the retrieved one or more features.

Embodiment 15. The method of embodiment 14, further comprising: communicating the one or more features to the first edge node in response to determining that the global map includes the one or more features.

Embodiment 16. The method of embodiments 14 and/or 15, further comprising: communicating the one or more features to the first edge node in response to determining that the global map includes the one or more features.

Embodiment 17. The method of embodiments 14, 15 and/or 16, further comprising: in response to determining that the global map does not include the reference, updating a feature request list with the requested one or more features.

Embodiment 18. A method comprising: identifying one or more features for one or more decision-making tasks that are to be performed by a central node of an edge computing system, the one or more features including information used by the central node to execute the one or more operational actions; determining if a global map representing a global representation of a map structure includes the one or more features; in response to determining that the global map does not include the one or more features, retrieving the one or more features; and updating the global map to include the retrieved one or more features.

Embodiment 19. The method of embodiment 18, wherein the one or more features are retrieved from an edge node of an edge computing system in response to a reference in the global map to a location of the one or more features at the edge node.

Embodiment 20. The method of embodiments 18 and/or 19, further comprising: in response to determining that the global map does not include the one or more references, updating a feature request list with the requested one or more features.

Embodiment 21. A method for performing any of the operations, methods, or processes, or any portion of any of these, or any combination thereof, disclosed herein.

Embodiment 22. A non-transitory storage medium having stored therein instructions that are executable by one or more hardware processors to perform operations comprising the operations of any one or more of embodiments 1-21.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
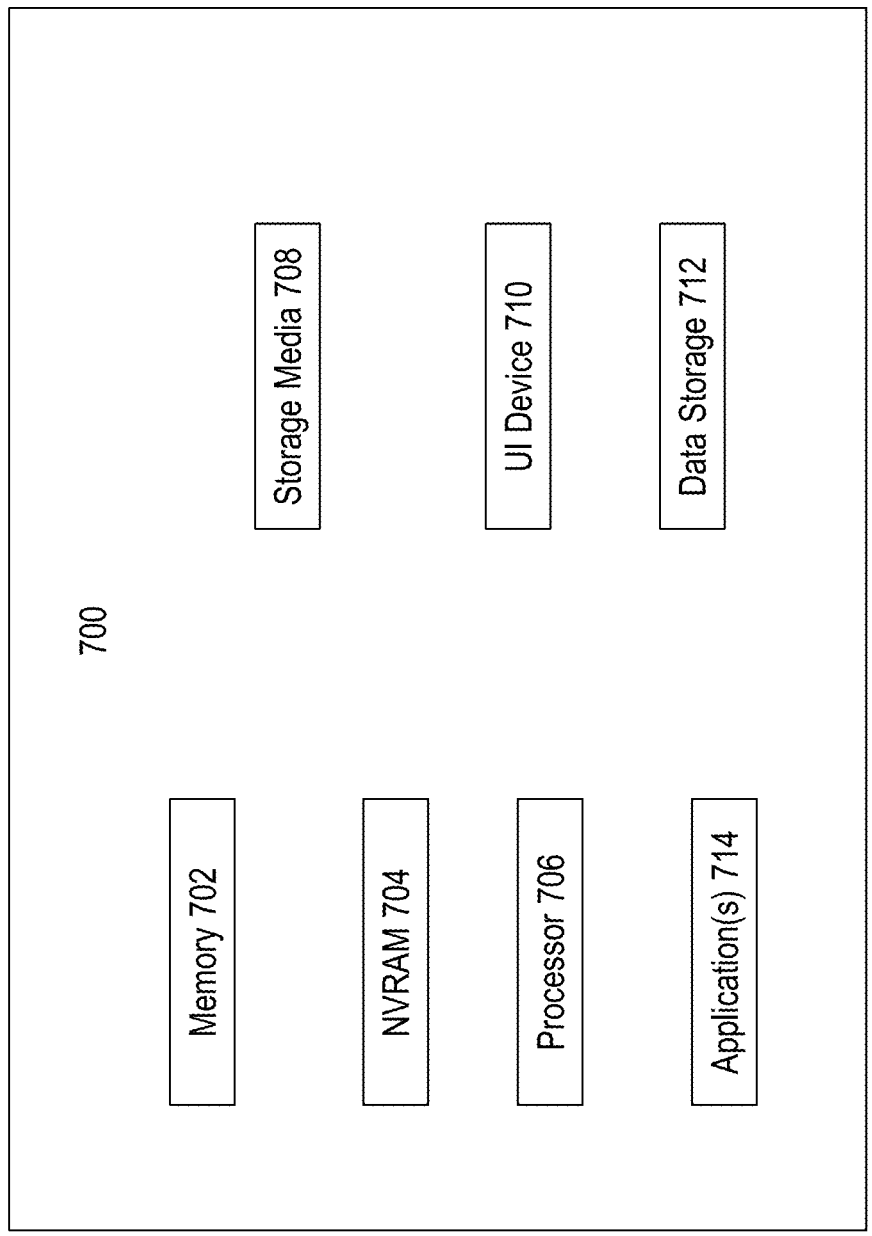
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
identifying one or more features for one or more operational actions that are to be performed at an edge node of an edge computing system, the one or more features including information usable by the edge node to execute the one or more operational actions;
retrieving a first set of the one or more features during an input processing stage, and the retrieving comprises:
accessing a timestamp associated with the one or more features that exist in a local map at a time of the input processing stage, the timestamp identifying when the one or more features were included in the local map;
based on the timestamp, determining an amount of time that has passed since the one or more features were included in the local map; and
using the one or more features that exist in the local map at the time of the input processing stage in the execution of the one or more operational actions when it is determined that the amount of time that has passed does not exceed a maximum allowed amount of time;
using the first set of the one or more features in the execution of the one or more operational actions;
in response to the execution of the one or more operational actions, obtaining a second set of the one or more features; and
in response to retrieving the first set of the one or more features or in response to obtaining the second set of the one or more features, updating the local map to include the one or more features, the local map including a subset of a global map, where the local map and the global map represent a shared representation of a map structure.

2. The method of claim 1, wherein retrieving the first set of the one or more features during the input processing stage comprises:
retrieving one or more features that exist in the local map at a time of the input processing stage.

3. The method of claim 1, wherein retrieving the first set of the one or more features during the input processing stage comprises:
extracting the one or more features from sensor data collected at the edge node.

4. The method of claim 1, wherein retrieving the first set of the one or more features during the input processing stage comprises:
receiving the one or more features from a central node of the edge computing system in response to a request for the one or more features from the edge node.

5. The method of claim 1, wherein the one or more features are associated with a timestamp when being included in the local map during the update to the local map.

6. The method of claim 1, further comprising:
in response to determining that the amount of time that has passed does exceed a maximum allowed amount of time, not using the one or more features that exist in the local map at the time of the input processing stage in the execution of the one or more operational actions;
extracting the one or more features from sensor data collected at the edge node; or
receiving the one or more features from a central node of the edge computing system in response to a request for the one or more features from the edge node.

7. The method of claim 1, further comprising:
in response to obtaining the second set of the one or more features, updating in the local map the one or more features of the second set that existed in the local map prior to the execution of the one or more operational actions.

8. The method of claim 1, further comprising:
in response to obtaining the second set of the one or more features, updating in the local map the one or more features of the second set that are included in a request from a central node of the edge computing system.

9. The method of claim 1, further comprising:
in response to obtaining the second set of the one or more features, not updating in the local map the one or more features of the second set that did not exist in the local map prior to the execution of the one or more operational actions and that are not included in a request from a central node of the edge computing system.

10. The method of claim 1, wherein the one or more operational actions to be executed are defined in a decision-making task generated by a central node of the edge computing system.

11. The method of claim 1, wherein the global map has a hierarchical structure.

12. The method of claim 11, wherein the global map is an Octomap.

* * * * *